Figure 1:
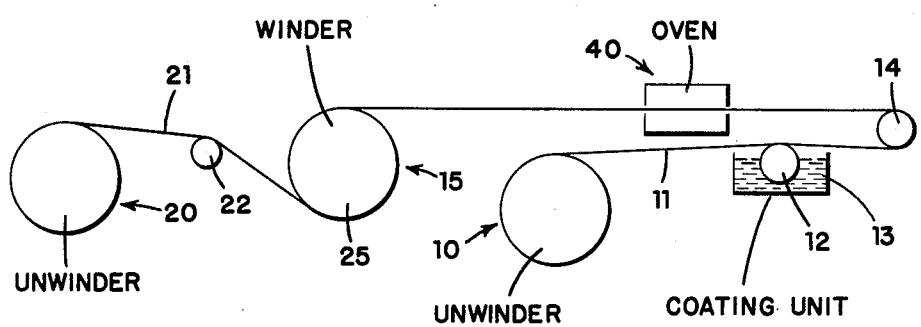

Jan. 22, 1957     F. W. HOLT, JR     2,778,744

METHOD OF MAKING THERMOPLASTIC TAPE

Filed April 20, 1953

*INVENTOR.*
FREDERICK W. HOLT, JR.
BY
ATTORNEYS

2,778,744
METHOD OF MAKING THERMOPLASTIC TAPE

Frederick W. Holt, Jr., Troy, Ohio, assignor to The Brown-Bridge Mills Company, Inc., Troy, Ohio, a corporation of Ohio Application April 20, 1953, Serial No. 349,819

4 Claims. (Cl. 117—66)

This invention relates to adhesive materials, and more particularly to the production of webs or sheets having thereon a thermoplastic adhesive coating of the type characterized by non-tackiness at or below normal room temperatures but becoming tacky when heated and then remaining tacky for an appreciable period of time after cooling to or below the temperature at which it is normally non-tacky.

Adhesive materials possessing these characteristics are highly useful for many purposes such as labeling, sealing and the like, since it is possible with such materials to activate the adhesive to a tacky condition an appreciable time before it is applied to the surface to be labeled or sealed, as contrasted with thermoplastic adhesives which set effectively instantaneously upon cooling and which must therefore be activated at a location which is as close as possible to their point of application.

The property of prolonged or delayed tackiness which makes such materials especially useful, however, complicates the initial coating of the adhesive film on a label or other web of sheet material. Thus if the adhesive is applied from a dispersion in a liquid dispersion medium, the latter must be eliminated in order to dry the film. A prolonged drying or heating operation is therefore required, and if the latter, then care must necessarily be taken to avoid heating the film to such a degree to render it tacky. In addition, if the adhesive is applied from solution or in molten condition, then the same properties of prolonged tackiness which are present when it is used as an adhesive are also present in its initial application, and normally the same setting time would be required.

My copending application Serial No. 101,060 filed June 24, 1949 and issued May 11, 1954 as Patent No. 2,678,284 to the same assignee as this application discloses a process for quickly setting to non-tacky consistency an adhesive film possessing these properties of prolonged tackiness. More particularly, that application describes a process in which a thermoplastic adhesive of this character, containing a plasticizer normally solid at room temperature, is formed into a fused film on a web, as by coating from a hot melt. This film is cooled to a temperature below the normal softening point of its solid plasticizer constituent, and it is then set substantially instantaneously to non-tacky condition by applying thereto a relatively small amount of the same plasticizer already present therein, with this added plasticizer being applied in finely divided solid form.

The present invention is directed to the provision of another process for producing a web having thereon a thermoplastic adhesive film of the above character in which the film is fused during the course of its application to the web and in which the coated web may be rolled or stacked substantially immediately after coating without blocking and without requiring the addition of any setting agent to the film.

Another object of the invention is to provide a method for an adhesively coated web as outlined above in which the coated web to which the fused adhesive material is permanently adherent is interleaved with or laminated to a separate web of such character that the adhesive material will not adhere thereto after setting while in intimate contact therewith, and this interleaved or covering web is then removed after the film has set.

It is also an object of the invention to provide a method of producing a web having thereon a thermoplastic adhesive film as outlined above in which the web which is used as a cover layer for the tacky film may be removed and reused many times after the film has set to completely non-tacky and non-blocking consistency.

Additional objects and advantages of the invention will be apparent from the following description, the accompanying drawings and the appended claims.

Figure 2:
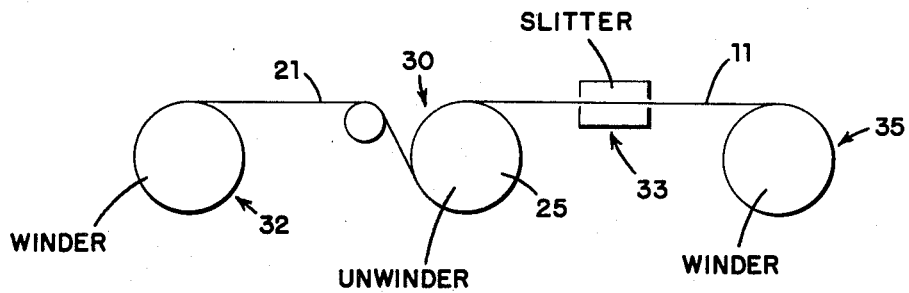

In the drawing:

Fig. 1 is a diagrammatic view illustrating an arrangement of apparatus for practicing the method of the present invention; and Fig. 2 is another diagrammatic view illustrating the removal of the temporary covering web from the coated web after the adhesive film has set.

Referring to the drawing, which illustrates preferred embodiments of the present invention, Fig. 1 shows diagrammatically at 10 an unwind stand carrying a roll of paper 11 or other sheet or web material which is to be coated with the thermoplastic adhesive film. The web 11 passes from roll 10 to a coating unit illustrated diagrammatically as a roll 12 rotatable in a reservoir 13 of the adhesive material, which may for example be in molten condition as a hot melt. The coated web 11 then passes around a guide roll 14 directly to a winder indicated diagrammatically at 15.

Fig. 1 shows diagrammatically at 20 a second unwind stand carrying a roll of web material 21 to which the selected adhesive in the reservoir 13 is substantially non-adherent when fully set, even though it may be strongly adherent thereto while in fused condition and is permitted to set in intimate contact therewith. The web 21 is accordingly conducted as by one or more guide rolls 22 to the winder 15 in such manner that it is effectively laminated to the coated web 11 as the resulting composite web winds into a roll on the winder.

In accordance with the invention, the roll 25 of the composite web is permitted to set while in rolled condition, as by storage for a sufficient length of time at a temperature suitably below its softening range. Thereafter, the roll is unwound and the web 21 is removed therefrom. This separation of the two webs is readily effected either in a simple rewinding operation or preferably in connection with a slitting or sheeting operation which is normally practiced with adhesively coated webs to prepare them for commercial sale. Fig. 2 shows the roll 25 of composite web on an unwinder indicated diagrammatically at 30, with the web 21 being peeled away over a guide roll 31 to a winder 32. At the same time, the coated web 11 passes through a slitter indicated diagrammatically at 33 to a winder 35. It will be apparent that if the coated web is to be sold in sheet form, a suitable cutting and stacking mechanism may be substituted at 33 and 35 in Fig. 2.

The method of the invention as described is simple and economical, requiring as it does no special equipment. It is applicable to webs coated from a hot melt, and it is equally applicable to the production of coated webs in which the adhesive is applied from a solution or dispersion. In either of the latter cases, it is only necessary to add a suitable oven or other heater as indicated at 40 in Fig. 1 for evaporating the solvent or dispersion medium at a temperature sufficient to fuse the film while the solvent or dispersion medium is driven off. Thereafter, the coated web may be handled as already described in connection with Figs. 1 and 2.

The method of the present invention is applicable to a wide variety of adhesive materials of the general character described above, including all of the several formulations listed as examples in my above copending application, a typical example being as follows:

*Example I*

| | Parts |
|---|---|
| Diphenyl phthalate | 66 |
| Lustrex L-15 (polystyrene) | 19 |
| Cumar W (paracumarone indene resin) | 15 |

The temporarily used web 21 should be selected in accordance with the adhesive formulation, with the objective being to employ a temporary web to which the adhesive is effectively non-adherent when set even though it is caused to set while in intimate contact with the temporary web. Among typical examples of webs having such desired properties with respect to one or more of the formulations listed in my above application may be noted the following:

Aluminum foil
Moisture-proofed regenerated cellulose
Pliofilm-rubber hydrochloride
Cellulose acetate
Polyethylene
Saran-polyvinylidine chloride
Teflon-polytetrafluoroethylene
Paper or textile material treated with a release agent such as a silicone resin or laminated to one of the other webs above.

Of all the examples in the above list, polyethylene appears to have at least as wide a field of application as any of the others and is desirably non-adherent for the purposes of the invention with all of the illustrative formulations described in my above noted application. Obviously, however, it is a simple matter to test any desired such film with the adhesive of the particular formulation to be used in order to select a web of the desired characteristics as outlined.

While the method herein described constitutes a preferred embodiment of the invention, it is to be understood that the invention is not limited to this precise method, and that changes may be made therein without departing from the scope of the invention which is defined in the appended claims.

What is claimed is:

1. In a method of producing a web having thereon a coating of a predetermined selected thermoplastic adhesive which is normally solid at room temperature and which is adapted to become usefully tacky upon fusion by heating above room temperature and then to remain tacky for a substantial period after cooling to room temperature, the steps of continuously advancing a web of a material to which said selected adhesive is permanently adherent following setting from the fused state while in contact therewith and both surfaces of which are substantially identical with respect to said adherence of said adhesive thereto, continuously forming on one side of said advancing web a fused tacky film of said adhesive, continuously applying to the resulting coated and tacky side of said web a second web of a selected different material to which said adhesive is substantially non-adherent even after setting from the fused state while in intimate contact therewith, winding the resulting composite web in a roll with said second web in contact with the back side of said coated web to which said tacky coated side would adhere in said roll in the absence of said second web, causing said film to set to non-tacky consistency while said composite web is wound in said roll, thereafter unwinding said roll and removing said second web therefrom, and winding said coated web in a second roll with said coated side thereof in direct contact with said back side thereof.

2. In a method of producing a web having thereon a coating of a predetermined selected thermoplastic adhesive which is normally solid at room temperature and which is adapted to become usefully tacky upon fusion by heating above room temperature and then to remain tacky for a substantial period after cooling to room temperature, the steps of forming a hot melt of said selected adhesive in fused condition, continuously advancing a web of a material to which said selected adhesive is permanently adherent following setting from the fused state while in contact therewith and both surfaces of which are substantially identical with respect to said adherence of said adhesive thereto, continuously applying to one side of said advancing web a tacky film of said hot melt, continuously applying to the resulting coated and tacky side of said web a second web of a selected different material to which said adhesive is substantially non-adherent even after setting from the fused state while in intimate contact therewith, winding the resulting composite web in a roll with said second web in contact with the back side of said coated web to which said tacky coated side would adhere in said roll in the absence of said second web, causing said film to set to non-tacky consistency while said composite web is wound in said roll, thereafter unwinding said roll and removing said second web therefrom, and winding said coated web in a second roll with said coated side thereof in direct contact with said back side thereof.

3. In a method of producing a web having thereon a coating of a predetermined selected thermoplastic adhesive which is normally solid at room temperature and which is adapted to become usefully tacky upon fusion by heating above room temperature and then to remain tacky for a substantial period after cooling to room temperature, the steps of forming a solution of said adhesive and a solvent therefor, continuously advancing a web of a material to which said selected adhesive is permanently adherent following setting from the fused state while in contact therewith and both surfaces of which are substantially identical with respect to said adherence of said adhesive thereto, continuously applying a film of said solution to one side of said advancing web, heating said film until said solvent has been eliminated therefrom to fuse said film to tacky condition, continuously applying to the resulting coated and tacky side of said web a second web of a selected different material to which said adhesive is substantially non-adherent even after setting from the fused state while in intimate contact therewith, winding the resulting composite web in a roll with said second web in contact with the back side of said coated web to which said tacky coated side would adhere in said roll in the absence of said second web, causing said film to set to non-tacky consistency while said composite web is wound in said roll, thereafter unwinding said roll and removing said second web therefrom, and winding said coated web in a second roll with said coated side thereof in direct contact with said back side thereof.

4. In a method of producing a web having thereon a coating of a predetermined selected thermoplastic adhesive which is normally solid at room temperature and which is adapted to become usefully tacky upon fusion by heating above room temperature and then to remain tacky for a substantial period after cooling to room temperature, the steps of forming a dispersion of the constituent materials of said adhesive in a dispersion medium, continuously advancing a web of a material to which said selected adhesive is permanently adherent following setting from the fused state while in contact therewith and both surfaces of which are substantially identical with respect to said adherence of said adhesive thereto, continuously applying a film of said dispersion to one side of said advancing web, heating said film until said dispersion medium has been eliminated therefrom and said film is in fused tacky condition, continuously applying to the resulting coated and tacky side of said web a second web of a selected different material to which said adhesive is substantially non-adherent even after setting from the fused state while in intimate contact therewith, winding the resulting composite web in a roll with said second web in contact with the back side of said coated web to which said tacky coated side would adhere in said roll in the absence of said second web, causing said film to set to non-tacky consistency while said composite web is wound in said roll, thereafter unwinding said roll and removing said second web therefrom, and winding said coated web in a second roll with said coated side thereof in direct contact with said back side thereof.

References Cited in the file of this patent

UNITED STATES PATENTS

| | | |
|---|---|---|
| 2,206,899 | Kellgren | July 9, 1940 |
| 2,227,494 | Gold | Jan. 7, 1941 |
| 2,395,257 | Dildilian | Feb. 19, 1946 |
| 2,462,029 | Perry | Feb. 15, 1949 |
| 2,631,955 | Muskat | Mar. 17, 1953 |
| 2,653,880 | Hendricks | Sept. 29, 1953 |